(12) United States Patent
Bazin et al.

(10) Patent No.: US 8,047,125 B2
(45) Date of Patent: Nov. 1, 2011

(54) COFFEE MAKER EQUIPPED WITH A STEAM NOZZLE

(75) Inventors: Nicolas Bazin, Herouville Saint Clair (FR); Gilles Morin, Sainte Honorine du Fay (FR); Romain Turpin, Caen (FR); Didier Brodin, Verson (FR)

(73) Assignee: SEB S.A., Ecully (FR)

( * ) Notice: Subject to any disclaimer, the term of this patent is extended or adjusted under 35 U.S.C. 154(b) by 706 days.

(21) Appl. No.: 11/722,400

(22) PCT Filed: Dec. 14, 2005

(86) PCT No.: PCT/FR2005/003163
§ 371 (c)(1),
(2), (4) Date: Sep. 25, 2008

(87) PCT Pub. No.: WO2006/067313
PCT Pub. Date: Jun. 29, 2006

(65) Prior Publication Data
US 2009/0301310 A1    Dec. 10, 2009

(30) Foreign Application Priority Data
Dec. 21, 2004 (FR) .................................. 04 13662

(51) Int. Cl.
*A47J 31/44* (2006.01)

(52) U.S. Cl. ........................................ 99/293; 99/323.1
(58) Field of Classification Search ................ 99/293, 99/323.1
See application file for complete search history.

(56) References Cited

U.S. PATENT DOCUMENTS

| 5,372,061 A | * | 12/1994 | Albert et al. ................ 99/281 |
| 5,638,740 A | | 6/1997 | Cai |
| 5,931,080 A | * | 8/1999 | Roure Boada ................ 99/293 |
| 6,293,187 B1 | | 9/2001 | Zils |

FOREIGN PATENT DOCUMENTS

| DE | 29810291 | | 9/1998 | |
| EP | 0140841 | * | 8/1985 | .............. 99/293 |
| EP | 1051940 | | 11/2000 | |
| EP | 1199016 | | 4/2002 | |

\* cited by examiner

*Primary Examiner* — Reginald L Alexander
(74) *Attorney, Agent, or Firm* — Young & Thompson

(57) ABSTRACT

The inventive coffee machine is provided with a housing (2) including a coffee output (9, 10), a steam generator and a steam output nozzle (20) which is movable with respect to the housing and is provided with a free end (22) immersible into a cup. The free end is introducible into a space under the coffee output (9, 10) and is translationally displaceable between an elevated position in which the free end (22) is placed at least substantially at the level of the coffee output (9, 10) and a lower position in which the free end (22) is immersible into a cup which is positioned in such a way that it receives espresso coffee.

17 Claims, 4 Drawing Sheets

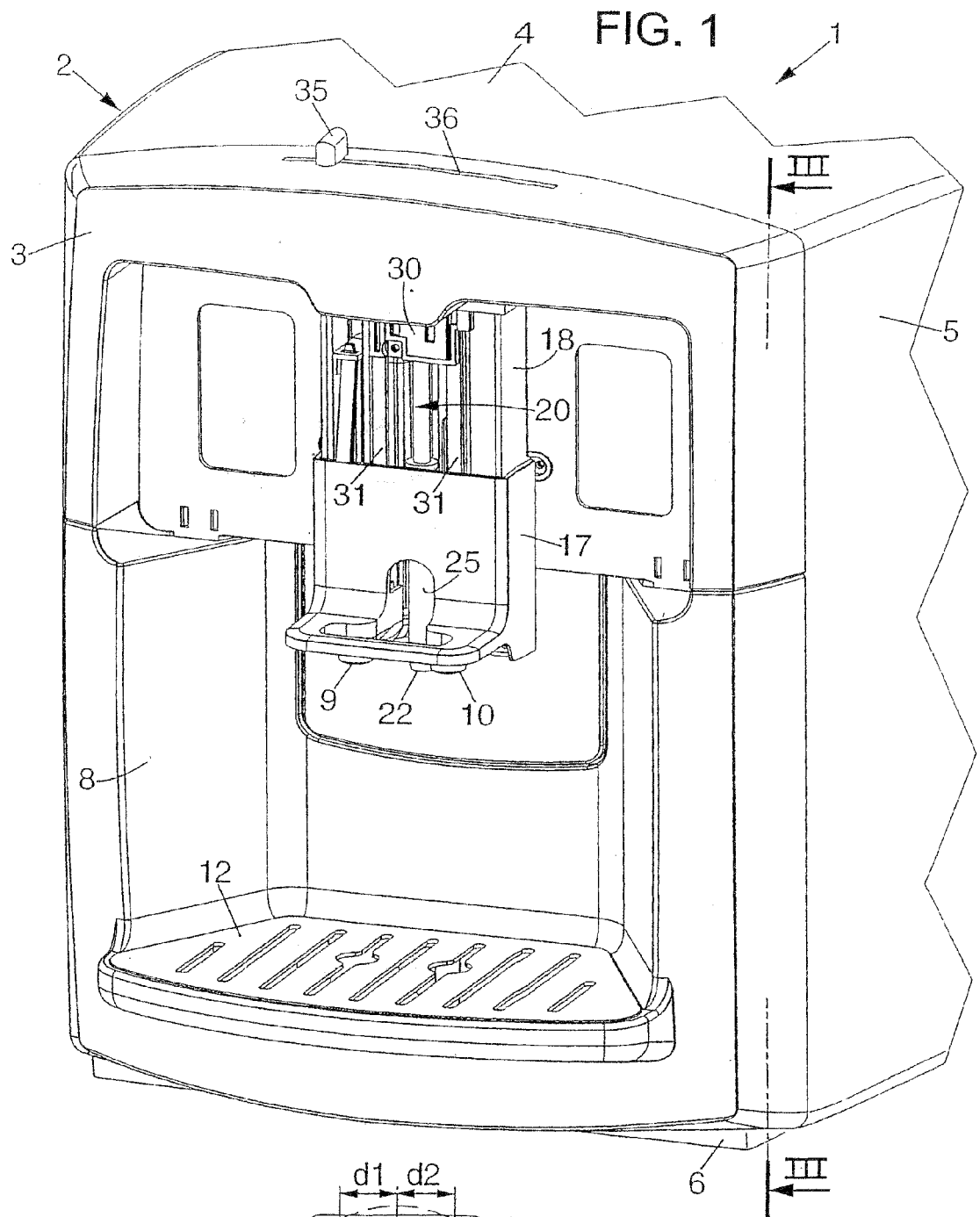
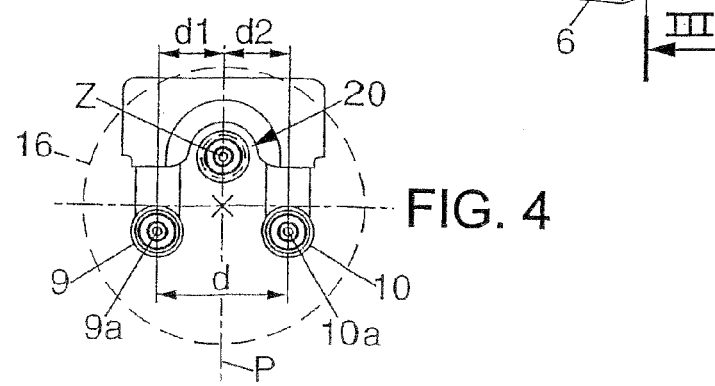

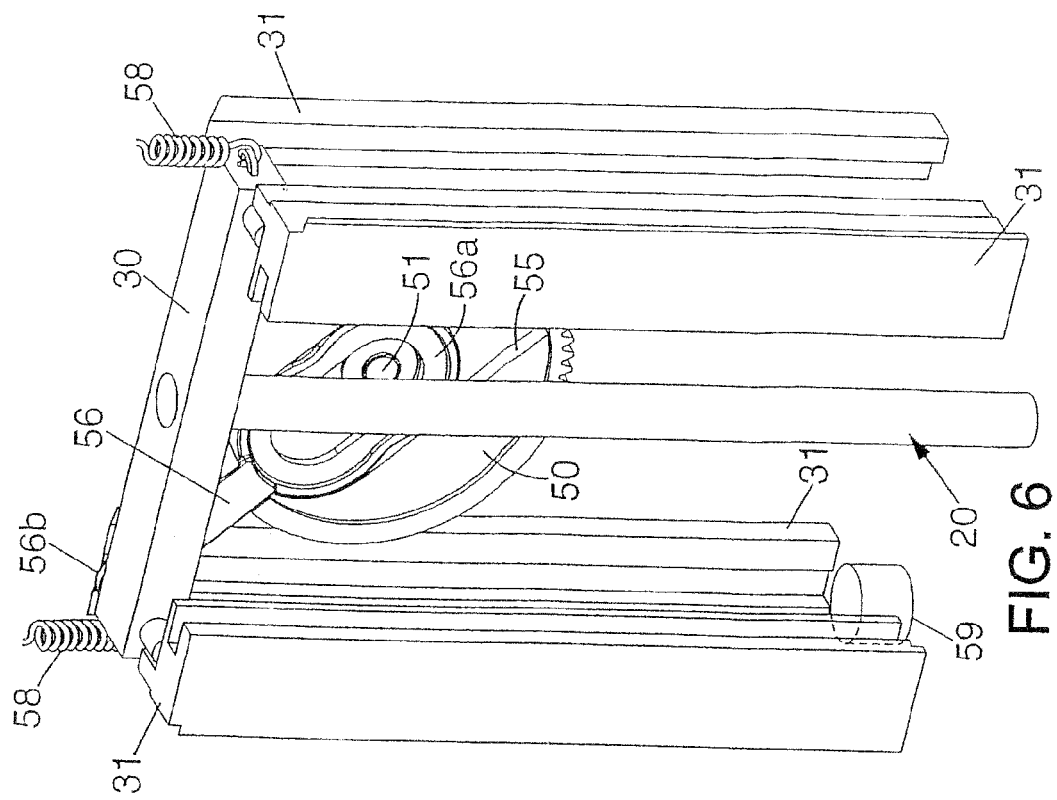
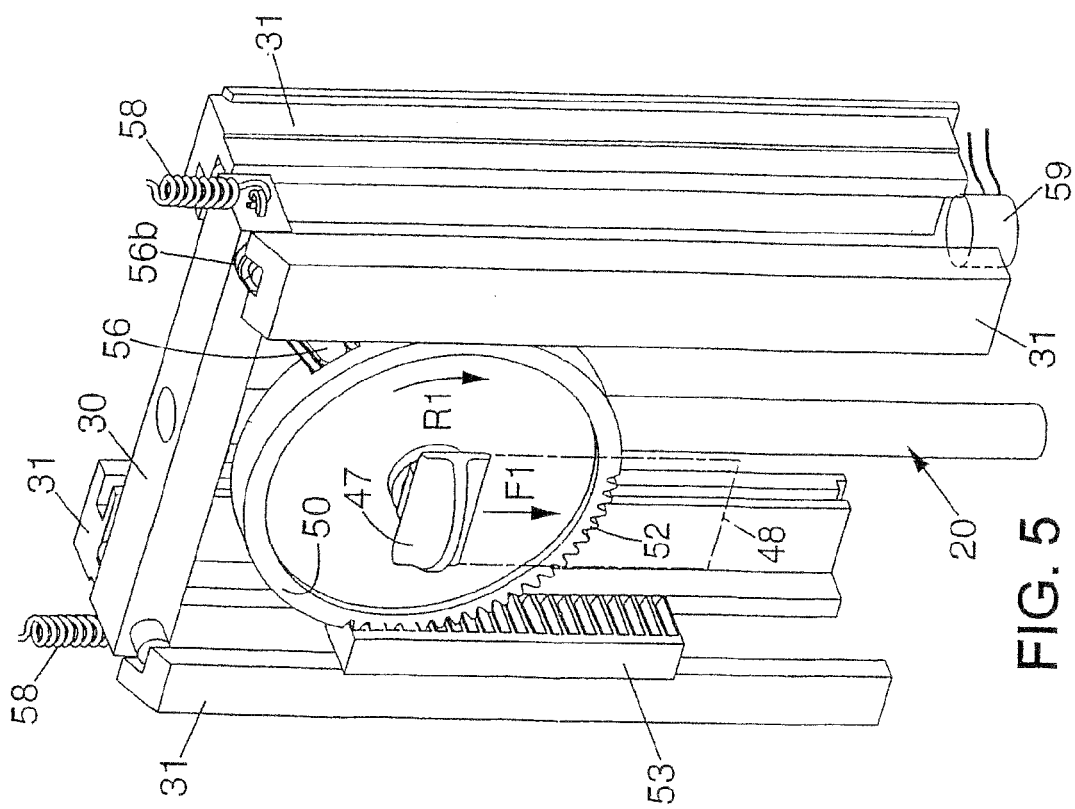

COFFEE MAKER EQUIPPED WITH A STEAM NOZZLE

This invention relates to a coffee maker that is equipped with a steam outlet nozzle. More particularly, this invention relates to a coffee maker comprising a casing that includes at least one coffee outlet by which a coffee infusion can flow into a cup, a steam generator, and a steam outlet nozzle that can move relative to the casing and that is connected to the steam generator, said nozzle having one free end that can be immersed into the cup.

Providing a steam outlet nozzle on coffee makers, especially on espresso-type coffee makers, is known. The nozzle makes it possible to inject the steam especially into milk contained in a cup to heat the latter for purposes of preparing café au lait, called latte, or to emulsify the milk in order to prepare cappuccino. It is possible to use an accessory that makes it possible to carry air with the steam into the milk in such a way that the operation of emulsifying the milk does not require particular dexterity.

A coffee maker that is equipped with a steam outlet nozzle that allows emulsification of milk is known from document U.S. Pat. No. 5,638,740. The advantage of this type of nozzle in which only steam, and if necessary air, circulates, is that their maintenance is very simple, given that it is simply a matter of wiping the end of the nozzle with a wet cloth to remove the traces of milk that may remain after use. Actually, there are devices for preparing hot milk or foamed milk in which the milk is drawn in by the Venturi effect into a chamber that is internal to the casing of the machine or produced in an accessory mounted on the end of the nozzle. These devices make it possible to deliver the milk directly to the nozzle outlet, but they have the major defect of requiring disassembly or a complex rinsing system to remove the milk remaining on the internal chamber and the tubes.

However, known coffee makers that are equipped with steam outlet nozzles are not completely satisfactory because they require many manipulations. Actually, the user must manipulate the cup to place the steam nozzle into it, then actuate the injection of steam to emulsify or heat the milk while holding the cup in his hand or by placing it on a support that has been preset as described in the document U.S. Pat. No. 5,638,740, then, once this operation is completed, again manipulate the cup that can be relatively hot in order to place it under the coffee outlets and finally actuate the brewing of the coffee.

The purpose of this invention is to improve existing coffee makers by limiting the number of manipulations of the cup to be carried out during preparation of a latte or a cappuccino, while preserving the capacity to maintain coffee makers that are equipped with a steam outlet nozzle.

For this purpose, the object of this invention is a coffee maker of the aforementioned type, characterized in that the free end of the nozzle can be brought into the space located under the coffee outlet and can be moved by translation between a raised position in which said free end is at least essentially at the level of the coffee outlet, and a lowered position in which said free end can be immersed in the cup that has been positioned so as to receive the infusion of coffee.

Thus, the user places the cup, partially filled with milk, under the coffee outlet in the conventional manner, and actuates, manually or according to an automated sequence, the lowering of the free end of the nozzle to immerse it in the milk, the injection of steam into the milk, lifting the free end of the nozzle into the raised position, then brewing of the coffee that flows into the cup from the coffee outlet. These operations thus do not require moving the cup during preparation of a latte or a cappuccino. Moreover, given that the milk does not circulate in the nozzle, it is not necessary for the user to perform the operation of cleaning the nozzle after preparing the beverage.

In preferred embodiments of the invention, moreover, one and/or another of the following arrangements can be used:
- the steam outlet nozzle can move along one essentially vertical axis arranged near the coffee outlet;
- the casing comprises two coffee outlets, and the nozzle is located essentially in the vertical median plane separating the two coffee outlets;
- the casing contains a device for guiding the nozzle, comprising a vertical guide along which the nozzle is mounted to be able to move, said nozzle in the lowered position projecting through an opening made in said casing; thus the mechanism for moving the nozzle and most of the nozzle when it is in the raised position are protected inside the casing;
- the vertical path of the nozzle from the raised position toward the lowered position is adapted for the free end of nozzle to be located at a minimum defined distance from the plane intended to receive the cup, said minimum distance being preferably between 10 and 20 mm, in such a way that the free end of the nozzle does not come into contact with the bottom of the cup;
- a manual control switch is mounted to be able to move on the casing and is connected to the nozzle by a control device that is adapted to moving the nozzle at least from the raised position to the lowered position when the control switch is actuated; thus, using the control device, the control switch can be placed at a location away from the nozzle and easy to access;
- the control device is adapted to entrain amplified movement of the nozzle relative to the movement of the control switch, thus limiting the range of the motion that the user must accomplish;
- the casing has a front surface on which there is an essentially vertical groove along which the control switch slides, the passage of the control switch from an Lp position to a down position entraining the movement of the nozzle from the raised position to the lowered position; this makes actuating the movement of the nozzle more intuitive for the user;
- the nozzle is attached in the raised position by an elastic attachment means and is adapted to work with an electromagnetic holding device, said holding device being adapted to keep the nozzle in the lowered position and to release the nozzle following reception of a signal transmitted by a first control device; this allows automatic lifting of the steam outlet nozzle before brewing the coffee; and
- a means for detecting the lowered position of the nozzle is connected to a second control device actuating the discharge of steam through the nozzle, said second control device being adapted to block the discharge of steam when the detection means indicates that the nozzle is not in the lowered position.

Other characteristics and advantages of the invention will become apparent during the following description; they are given by way of nonlimiting examples, with reference to the accompanying drawings, in which:

FIG. 1 is a partial perspective cutaway view of a coffee maker that is equipped with a steam outlet nozzle according to the invention, in which the nozzle is in the raised position;

FIG. 4 is a schematic bottom view of the steam outlet nozzle and of the coffee outlets of the coffee maker shown in FIG. 2;

FIG. 5 shows a simplified three-quarters front view of a second steam outlet nozzle control device; and FIG. 6 shows a simplified three-quarters rear view of the control device shown in FIG. 5.

In the various figures, identical references have been maintained to label identical or similar elements.

Figure 2:
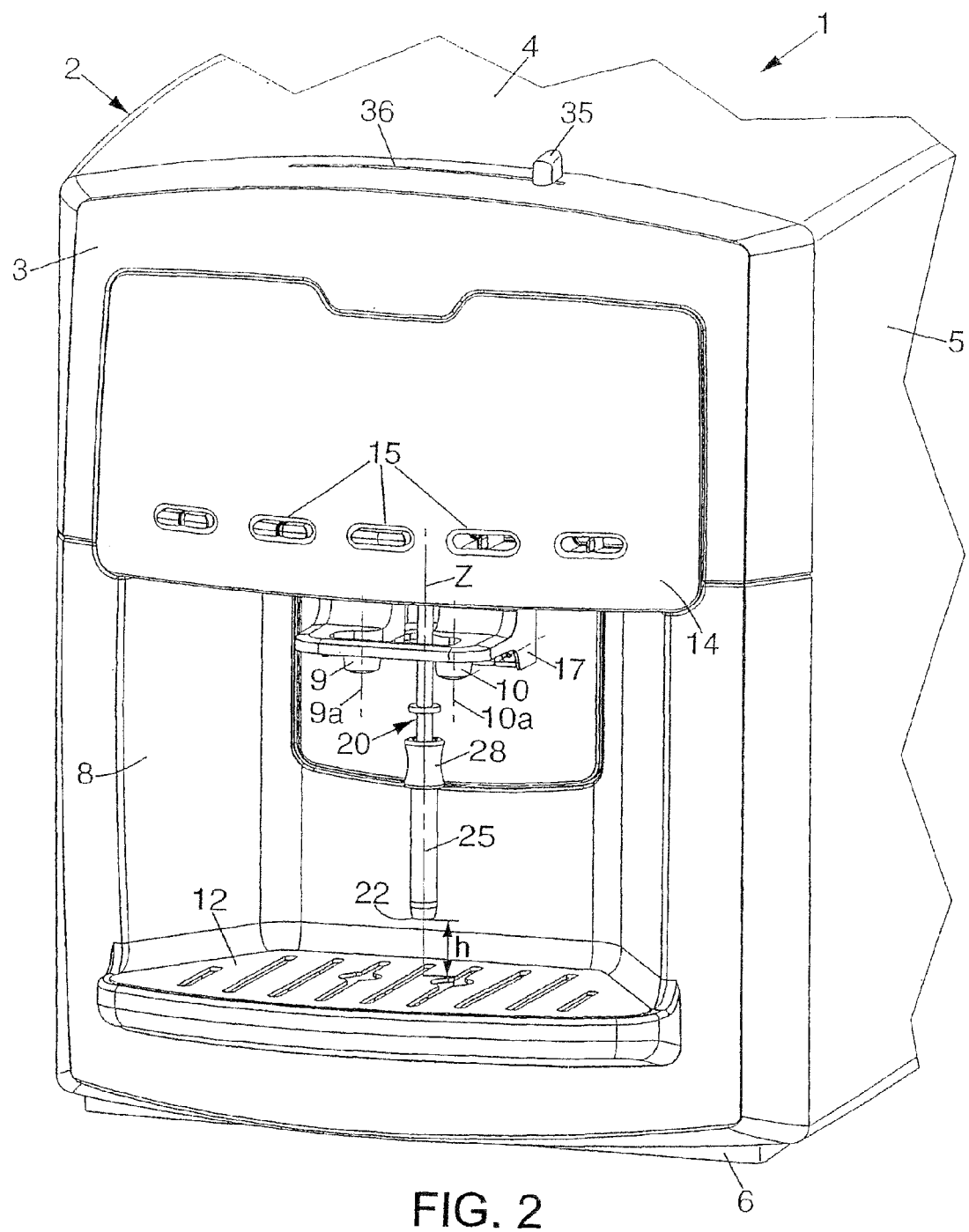
FIG. 2 is a perspective view analogous to FIG. 1 in which the steam outlet nozzle is in the lowered position.

FIG. 1 shows a coffee maker 1 that comprises a casing 2 having a front surface 3, an upper surface 4, side surfaces 5 and a base 6.

The front surface 3 of the casing has a recess 8 that is equipped in its upper part with two identical coffee outlets (9, 10) and that is delineated in its lower part by a cup resting plate 12. The cup resting plate 12 is an openwork metal grid under which a recovery drawer 13 is located, shown in FIG. 3, in which the coffee infusion that may run outside of the cups is recovered.

The front surface 3 of the casing, moreover, comprises a control panel 14, shown in FIG. 2, equipped with switches 15 that allow especially actuation of brewing of a more or less large amount of coffee and actuation of the generation of steam by the machine.

It should be noted that the front surface 3 of the casing could have a fundamentally different configuration, without the recess. For example, an upper part of the front surface could protrude, set back relative to the median part, the coffee outlets being arranged under this upper part, and a lower part could protrude into an extension of the base on which the cup resting plate would be located; or again, a median part that is set back could extend to the base, the cups then being located on the working plane on which the machine rests.

With regard to an automatic coffee maker, the casing 2 comprises in the known manner a coffee bean reservoir, a device for producing ground coffee and for transferring it into a percolation chamber, a device for producing and injecting hot water into the percolation chamber, a system of tubes that allows the coffee infusion to be brought from the percolation chamber to the coffee outlets, a coffee grind ejection device, a device for producing pressurized steam, as well as an electronic control device that is adapted for actuating the operation of these devices that are not shown in the figures. Such a coffee brewing system could likewise be of any other known type, such as, for example, a system using coffee packets, or ground coffee placed in a spoon for an espresso-type machine.

The two coffee outlets (9, 10) are arranged parallel to one another, each extending vertically toward the bottom, and are located at a relatively great height from the cup resting plate 12 so that one cup 16 (FIG. 3), or two cups, can be placed under the latter. The brewed coffee from the percolation chamber is routed by the tube system to two outlets (9, 10) by which the coffee flows into the cup by gravity.

As is more apparent in FIG. 4, the distance d measured horizontally between the two coffee outlets (9, 10) is less than the inside diameter of a standard coffee cup, shown diagrammatically by the broken line 16, and most containers for coffee-based beverages, the inside diameter of whose mouth is generally between 50 and 80 mm. Thus, it is not necessary to block one of the coffee outlets when the user wishes to brew a single cup of coffee. The two coffee outlets (9, 10) are separated by a sufficient distance to be able to place two cups side by side in such as way that the coffee flowing from each of the outlets is received in the corresponding cup.

In the embodiment shown, the two coffee outlets (9, 10) are mounted on a support 17 that runs along vertical flanges 18 attached to the casing 2 in such a way that the coffee outlets (9, 10) can be moved vertically. This movable mounting of the coffee outlets is not absolutely necessary, but allows positioning of the outlets (9, 10) high enough to place "latte"-type cups, whose height can reach 14 cm, and to lower the coffee outlets so they are slightly above "espresso"-type cups in such a way that the coffee flows into the latter without causing splashing. In this case, the system of tubes extending from the percolation chamber is adapted to follow the movements of the outlets (9, 10), for example using a tubular element discharging into a well that can move vertically with the outlets (9, 10).

The coffee maker 1, moreover, comprises a steam outlet nozzle 20. As is better shown in FIG. 3, the nozzle 20 comprises a rectilinear metal tube 21, a tip 22 attached to the lower end of the tube 21 and a lug 23 that is attached to the upper end of the tube 21 and on which a flexible tube 24 is fitted, for example of silicone, which establishes a connection between a steam generator (not shown) and the nozzle 20 via an electric valve that is not shown. The tip 22 of the nozzle 20 has a primary orifice that is calibrated to create a jet of steam and that forms the free end of the nozzle 20 that can be immersed in the cup 16 containing the milk 19.

The nozzle 20 is mounted to be able to move relative to the casing 2 of the machine along a vertical axis Z between a raised position shown in FIG. 1 and a lowered position shown in FIG. 2.

In the raised position, the free end 22 of the nozzle 20 is roughly at the height of the coffee outlets (9, 10) or is located at a slightly lower height, but it must not disturb the placement of a cup on the cup resting plate 12. It is also possible to provide a higher raised position in such a way that the nozzle 20 is completely retracted into the casing 2.

As is shown better in FIG. 4, the vertical axis Z of movement of the nozzle 20 is located near the coffee outlets (9, 10), i.e., at a horizontal distance (d1, d2) from each of the vertical axes (9a, 10a) that pass through the center of the coffee outlets (9, 10) that is less than the diameter of the mouth of a coffee cup. For example, in the embodiment shown, the distances d1 and d2 are each roughly 30 mm; this is distinctly less than the inside diameter of a cup that is generally between 50 and 80 mm.

More especially, in the embodiment shown in FIG. 4, the axis Z of movement of the steam outlet nozzle 20 is located in the median vertical plane P separating the two coffee outlets (9, 10). In the case of a coffee maker that has only one coffee outlet, only the distance between the axis of this coffee outlet and the axis Z of movement of the nozzle need be less than the diameter of a cup.

The nozzle 20 is, moreover, surrounded by a sleeve 25 extending from the free end 22 of the nozzle to the intermediate longitudinal position of the tube 21. The sleeve 25 has one air inlet 26 (FIG. 3) located at its upper end, or at least at a distance from the free end 22 of the nozzle that is sufficient for the air inlet 26 not to be immersed in the milk when the free end 22 of the nozzle is dipped into the cup. The sleeve 25 thus forms an air hose 27 that is extended into the tip 22 by channels ending in the vicinity of the primary steam outlet orifice in such a way that the air is carried with the steam jet when the air inlet 26 is in communication with the atmosphere.

The sleeve 25 likewise comprises an air control 28 (FIG. 3) that can move between a so-called cappuccino position for which the air hose 27 is in communication with the atmosphere and a so-called latte position for which the air hose 27 is blocked.

Figure 3:
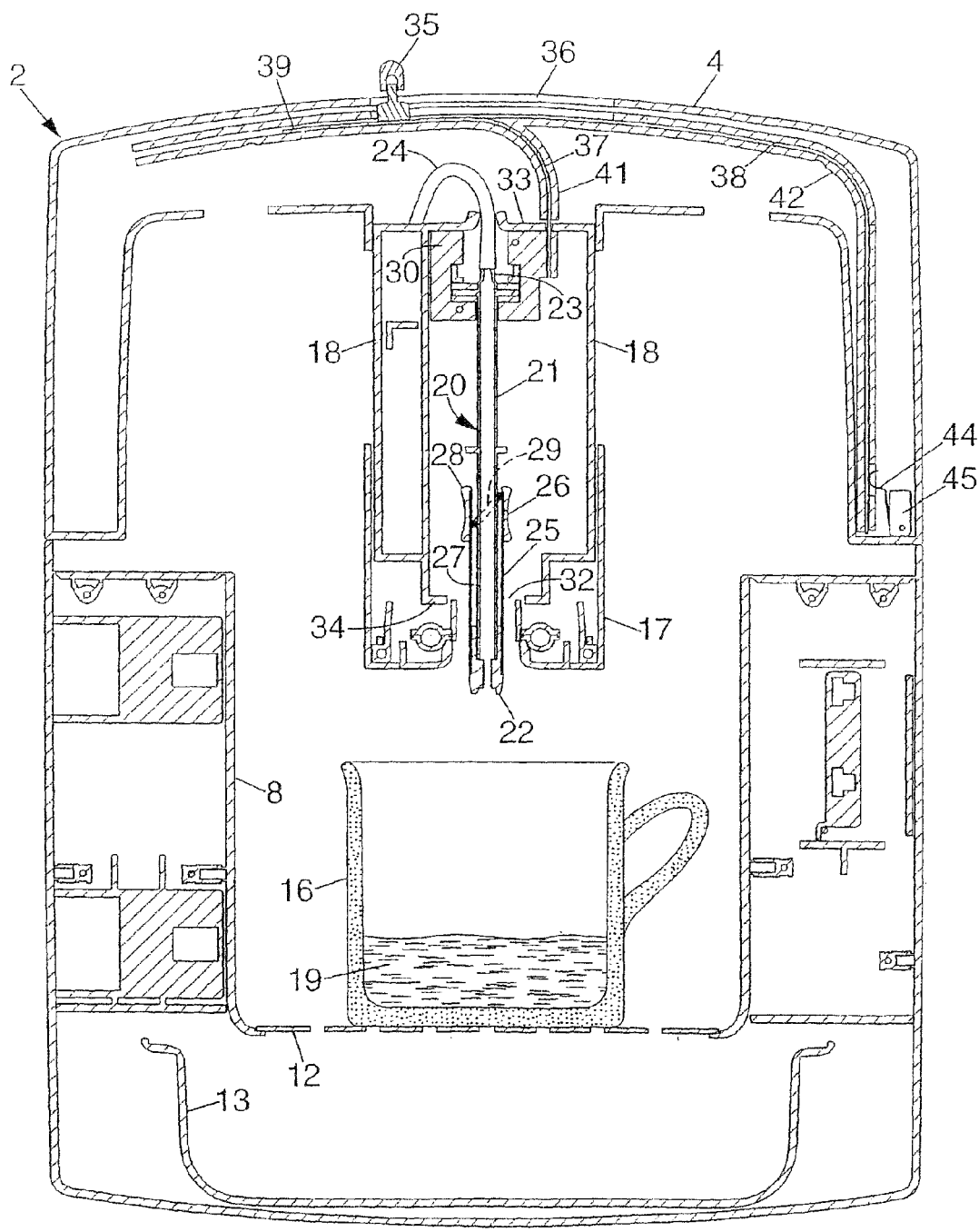
FIG. 3 is a simplified cutaway view along line III-III of FIG. 1, in which a first device for actuating the steam outlet nozzle and a cup partially filled with milk can be seen.

In the embodiment shown in FIG. 3, the air control 28 is integral with the sleeve 25. The combination (25, 28) that has been formed in this way is mounted to be able to rotate relative to the nozzle 20 such that the air inlet 26 formed across the control 28 and the sleeve 25 is located underneath a sealing means 29 located obliquely between the tube 21 and the air control 28 in the cappuccino position and is located above the sealing means 29 when the air control 28 is in the latte position.

Within the casing 2, a device for guiding the nozzle 20 for vertical movement is arranged. This guide device comprises a sliding carriage 30 on which there are attached the nozzle and vertical flanges 31, seen in FIG. 2, comprising guides along which the carriage 30 slides vertically.

The casing 2 has an opening 32 (FIG. 3) that is located on the lower end of the flanges and through which the nozzle 20, the sleeve 25 and the air control 28 can pass.

This device has the advantage of protecting the guide device and most of the nozzle in the raised position, inside the casing 2. It can be easily envisioned, however, that the nozzle be mounted so as to be able to move on a support that is located outside of the casing. For example, it could be a support that is mounted in an articulated manner on the front surface 3 of the casing, comprising, if necessary, several hose portions that are articulated among one another, and on the end of which the nozzle would be mounted with a capacity to move, especially in a telescoping manner. The base of such a support could be located at a distance from the coffee outlets, the articulation or articulations of the support allowing the nozzle to be moved into the space located underneath the coffee outlets when the user wants to inject steam into a cup.

The vertical path of the nozzle is defined by the carriage 30 sliding along vertical guides 31, upper stops 33 and lower stops 34 being located on the ends of the guides 31. The lower stop 34 is located at a distance from the cup resting plate 12, which is specified such that the minimum distance h separating the free end 22 of the cup resting plate 12 when the nozzle 20 is in the completely lowered position is not less than a minimum value. Thus, the free end 22 of the nozzle does not come into contact with the bottom of the cup; this could disrupt the emergence of the steam. The minimum distance h must take into account the fact that the coffee cups have a more or less thick bottom that, however, must not be too great for the free end 22 of the nozzle to dip effectively into the milk, even if the cup 16 only contains a small amount of milk 19 as shown in FIG. 3. Preferably a value of between 10 and 20 mm is chosen for the minimum distance h.

It should be noted that the movement of the carriage 30 is independent of the movement of the support 17 of the coffee outlets (9, 10), such that the position of the coffee outlets (9, 10) has no influence on the path of the nozzle 20.

It is conceivable to move the steam outlet nozzle 20 using a gripping element that is integral with the latter. Due to the presence of the coffee outlets (9, 10) near the nozzle 20, however, and in order to limit the risks of contact with hot or dirty parts, use of a manual control switch that is connected to the nozzle 20 by a control device is preferred.

In a first embodiment shown in FIGS. 1 to 3, the manual control switch 35 is mounted to be able to move along a horizontal groove 36 formed on the upper surface 4 of the casing 2. As FIG. 3 shows, the lower end of the switch 35 is attached to a first flexible belt 37 that is connected to a second flexible belt 38 by a common end 39. The belt 37 is adapted to slide in a guide 41 that is oriented towards the movable carriage 30 that supports the nozzle 20, and the end of the belt 37 is attached to the carriage 30 such that the movement of the manual control switch 35 is integrally transmitted to the nozzle 20. The use of a movable flexible element in a guide makes it possible to provide a great distance and complex routing between the manual control switch 35 and the nozzle 20.

The strip 38 can move in a guide 42 that on the end has an opening through which the arm 44 of a micro switch 45 passes. The micro switch 45 is connected to the control device of the machine. The belt 38 works with the arm 44 of the micro switch when the arm 20 is in the lowered position; this provides information about the position of the nozzle to the control device. The control device is then adapted for not actuating the opening of the electric valve acting on the steam outlet when it does not receive information indicating that the nozzle 20 is in the lowered position, even if the user actuates a steam control switch 15. Thus, emergence of a steam jet can only have taken place when the nozzle 20 has been lowered, i.e., is quite visible and near the cup resting plate 12.

In a second preferred embodiment of the control device of the steam outlet nozzle 20 shown in FIGS. 5 and 6, the manual control switch 47 is mounted to be able to move across a vertical groove 48 formed in the front surface of the casing, preferably in the upper part of the front surface located at the level of the nozzle 20. As in the preceding embodiment, the nozzle 20 is integral with a carriage 30 that can move along vertical guides 31.

In this second embodiment, FIGS. 5 and 6, the control device of the nozzle 20 comprises a disk 50 that is mounted to be able to rotate around an axle 51 that is integral with the switch 47 and that has a toothed sector 52 that engages with a fixed rack 53. As is shown in FIG. 6, the rear surface of the disk 50 has a guide 55 that extends along a diameter in which a crank 56 can move in translation, but cannot move in rotation relative to the disk 50. A first end 56a of the crank 56 comprises an elongated eyelet through which the axis of rotation 51 of the disk 50 passes, whereas a second end 56b of the crank 56 is fixed pivotally to the carriage 30.

When the user depresses the control switch 47 according to the arrow F1 of FIG. 5, the disk 50 executes the rotation given according to the arrow R1 from FIG. 5 due to its engagement with the rack 53, and the crank 56 executes rotation of the same amplitude. Because the arm of the lever of the crank 56 is larger than the radius of the toothed sector of the disk 50, depressing the control switch 47 entrains amplified displacement of the carriage 30. The possibility of translation of the crank 56 in the guide 55 of the disk allows displacement of the second end 56b of the crank along a vertical guide 31 in translation.

This control device, on the one hand, has the advantage of reducing the amplitude of the movement the user must accomplish to lower the nozzle on a given path, and, on the other hand, it is more intuitive for the user since the lowering of the nozzle 20 is actuated by depressing the switch 47 in the same direction.

The carriage 30 is elastically attached toward the top by draw springs 58 that are shown partially in FIGS. 5 and 6. Moreover, there is an electromagnet 59 located on the bottom end of a vertical guide 31 and adapted to hold the carriage 30 by magnetization, which carriage can be made either of ferromagnetic material or can include a magnetic cylinder head. It is possible, however, to provide another type of electromagnetic holding means of the carriage 30, such as, for example, an electromechanical actuator comprising a pin that comes into mechanical contact with the carriage 30 from the instant that the release of the carriage can be actuated simply by an electrical signal.

When the switch 47 is depressed until the carriage 30 comes into contact with the electromagnet 59, the control device of the machine supplies the electromagnet so as to keep the carriage 30 in the position corresponding to the lowered position of the nozzle 20. The supply of the electromagnet 59 can be controlled by a micro switch placed on the path of the carriage 30 and connected to the electronic control device of the machine. When the steam injection operation is completed, the control device cuts power to the electromagnet 59; this entrains the return of the carriage 30 and consequently of the nozzle 20 into the raised position under the action of the springs 58. Thus, the lifting of the nozzle can be automated. Completely automated control of the movements of raising and lowering the nozzle can also be envisioned. This, however, would require a motorized control that would entail a much greater production cost than that of the automation implemented using the draw springs 58 and the electromagnet 59.

To prepare a cappuccino or a latte using the above-described machine, the user places a cup 16 that is partially filled with milk 19 on the cup resting plate 12. He lowers the steam outlet nozzle 20 while moving the control switch 35 from left to right in the embodiment shown in FIGS. 1 to 3, or while moving the control switch 47 from up to down in the case of a control device implemented according to FIGS. 5 and 6.

The free end 22 of the nozzle is then located at a minimum distance h from the cup resting plate 12 such that it dips into the milk contained in the cup 16.

The user places the air control 28 in the cappuccino position or the latte position according to the beverage that he wishes to prepare.

Then, using one of the switches 15, he actuates the steam outlet by the nozzle 20. The control device that receives a signal from the micro switch 45 (FIG. 3) indicating that the nozzle 20 is in the lowered position actuates the opening of the steam outlet solenoid valve, either during the time of actuating the steam control button, or for an interval stored by the control device.

If the air control 28 is in the cappuccino position, some steam and air are injected into the milk and create a milk emulsion. If the air control 28 is in the latte position, only steam is injected into the milk; this allows the latter to be heated.

Next, the user can manually actuate the return of the steam nozzle 20 into the raised position. This return of the nozzle into the raised position can likewise be automatically implemented in the case of a machine comprising a control device according to a second embodiment.

The brewing of the coffee is then initiated either manually by the user or according to an automated sequence that has been stored by the control device of the machine. The coffee then flows through the coffee outlets (9, 10) and is collected in the cup.

It should be noted that with the coffee outlets adapted to allow the coffee to flow in a regular trickle, the foam formed by the milk emulsion is not destroyed by the flow of the coffee, but rises to the surface of the coffee, as is desired for a cappuccino.

In contrast to machines of the prior art in which the steam outlet nozzle is generally placed on the side of the machine, the user need not move the cup during preparation of a cappuccino or a latte. Moreover, the fact of retracting the steam outlet nozzle 20 into the casing 2 of the machine makes it possible to protect the nozzle 20 against impacts and to reduce the space requirements of the machine.

Of course, the above-described embodiments are in no way limiting. Actuating the movements of the nozzle by a motorized system or manually using a gripping element directly attached to the nozzle can easily be envisioned.

The invention claimed is:

1. Coffee maker comprising a casing (2) that includes at least one coffee outlet (9; 10) by which a coffee infusion can flow into a cup (16), a steam generator, and a steam outlet nozzle (20) that can move relative to the casing and that is connected to the steam generator, said nozzle (20) having one free end (22) that can be immersed in the cup, wherein the free end (22) of the nozzle (20) can be brought into the space located under the coffee outlet (9; 10) and can be moved by translation between a raised position in which said free end (22) is located essentially at the level of the coffee outlet (9; 10), and a lowered position in which said free end (22) can be immersed in the cup (16) that has been positioned so as to receive the infusion of coffee, wherein the steam outlet nozzle (20) can move along one essentially vertical axis (Z) that is arranged near the coffee outlet (9; 10), and wherein the casing (2) contains a device for guiding the nozzle (20) comprising a vertical guide (31) along which the nozzle (20) is mounted to be able to move, said nozzle (20) in the lowered position projecting through an opening (32) made in said casing.

2. Coffee maker according to claim 1, wherein the casing (2) comprises two coffee outlets (9, 10), and wherein the nozzle (20) is located essentially in the vertical median plane (P) separating the two coffee outlets.

3. Coffee maker according to claim 1, wherein the vertical path of the nozzle (20) from the raised position to the lowered position is adapted for the free end (22) of the nozzle to be located at a minimum defined distance (h) from the plane intended to receive the cup, said minimum distance (h) being preferably between 10 and 20 mm.

4. Coffee maker according to claim 2, wherein the casing (2) contains a device for guiding the nozzle (20) comprising a vertical guide (31) along which the nozzle (20) is mounted to be able to move, said nozzle (20) in the lowered position projecting through an opening (32) made in said casing.

5. Coffee maker according to claim 2, wherein the vertical path of the nozzle (20) from the raised position to the lowered position is adapted for the free end (22) of the nozzle to be located at a minimum defined distance (h) from the plane intended to receive the cup, said minimum distance (h) being preferably between 10 and 20 mm.

6. Coffee maker according to claim 1, wherein the vertical path of the nozzle (20) from the raised position to the lowered position is adapted for the free end (22) of the nozzle to be located at a minimum defined distance (h) from the plane intended to receive the cup, said minimum distance (h) being preferably between 10 and 20 mm.

7. Coffee maker according to claim 4, wherein the vertical path of the nozzle (20) from the raised position to the lowered position is adapted for the free end (22) of the nozzle to be located at a minimum defined distance (h) from the plane intended to receive the cup, said minimum distance (h) being preferably between 10 and 20 mm.

8. Coffee maker according to claim 1, wherein a manual control switch (35; 47) is mounted to be able to move on the casing (2) and is connected to the nozzle (20) by a control device (37; 41; 50, 53, 56) that is adapted to move the nozzle at least from the raised position to the lowered position when the control switch (35; 47) is actuated.

9. Coffee maker according to claim 1, wherein a means of detecting (45) the lowered position of the nozzle (20) is connected to a second control device actuating the discharge of steam through the nozzle, said second control device being adapted to block the discharge of steam when the detection means (45) indicates that the nozzle (20) is not in the lowered position.

10. Coffee maker comprising a casing (2) that includes at least one coffee outlet (9; 10) by which a coffee infusion can flow into a cup (16), a steam generator, and a steam outlet nozzle (20) that can move relative to the casing and that is connected to the steam generator, said nozzle (20) having one free end (22) that can be immersed in the cup, wherein the free end (22) of the nozzle (20) can be brought into the space located under the coffee outlet (9; 10) and can be moved by translation between a raised position in which said free end (22) is located essentially at the level of the coffee outlet (9; 10), and a lowered position in which said free end (22) can be immersed in the cup (16) that has been positioned so as to receive the infusion of coffee, wherein a manual control switch (35; 47) is mounted to be able to move on the casing (2) and is connected to the nozzle (20) by a control device (37; 41; 50, 53, 56) that is adapted to move the nozzle at least from the raised position to the lowered position when the control switch (35; 47) is actuated.

11. Coffee maker according to claim 10, wherein the control device (37, 41; 50, 53, 56) is adapted to entrain amplified movement of the nozzle (20) relative to the movement of the control switch (35; 47).

12. Coffee maker according to claim 10, wherein the casing (2) has a front surface (3) on which there is an essentially vertical groove (48) along which the control switch (47) slides, the passage of the control switch (47) from an up position to a down position entraining the motion of the nozzle (20) from the raised position to the lowered position.

13. Coffee maker according to claim 10, wherein the nozzle (20) is attached in the raised position by an elastic attachment means (58) and is adapted to work with an electromagnetic holding device (59), said holding device (59) being adapted to keep the nozzle (20) in the lowered position and to release said nozzle following reception of a signal transmitted by a first control device.

14. Coffee maker according to claim 11, wherein the casing (2) has a front surface (3) on which there is an essentially vertical groove (48) along which the control switch (47) slides, the passage of the control switch (47) from an up position to a down position entraining the motion of the nozzle (20) from the raised position to the lowered position.

15. Coffee maker according to claim 11, wherein the nozzle (20) is attached in the raised position by an elastic attachment means (58) and is adapted to work with an electromagnetic holding device (59), said holding device (59) being adapted to keep the nozzle (20) in the lowered position and to release said nozzle following reception of a signal transmitted by a first control device.

16. Coffee maker according to claim 12, wherein the nozzle (20) is attached in the raised position by an elastic attachment means (58) and is adapted to work with an electromagnetic holding device (59), said holding device (59) being adapted to keep the nozzle (20) in the lowered position and to release said nozzle following reception of a signal transmitted by a first control device.

17. Coffee maker comprising a casing (2) that includes at least one coffee outlet (9; 10) by which a coffee infusion can flow into a cup (16), a steam generator, and a steam outlet nozzle (20) that can move relative to the casing and that is connected to the steam generator, said nozzle (20) having one free end (22) that can be immersed in the cup, wherein the free end (22) of the nozzle (20) can be brought into the space located under the coffee outlet (9; 10) and can be moved by translation between a raised position in which said free end (22) is located essentially at the level of the coffee outlet (9; 10), and a lowered position in which said free end (22) can be immersed in the cup (16) that has been positioned so as to receive the infusion of coffee, wherein a means of detecting (45) the lowered position of the nozzle (20) is connected to a second control device actuating the discharge of steam through the nozzle, said second control device being adapted to block the discharge of steam when the detection means (45) indicates that the nozzle (20) is not in the lowered position.

* * * * *